Sept. 23, 1941.　　　　J. DARBY　　　　2,256,826
CLUTCH MECHANISM
Filed Nov. 10, 1939　　　　2 Sheets-Sheet 1

INVENTOR.
John Darby.
BY Morgan Finnegan and Durham
ATTORNEYS

Sept. 23, 1941.  J. DARBY  2,256,826
CLUTCH MECHANISM
Filed Nov. 10, 1939  2 Sheets-Sheet 2
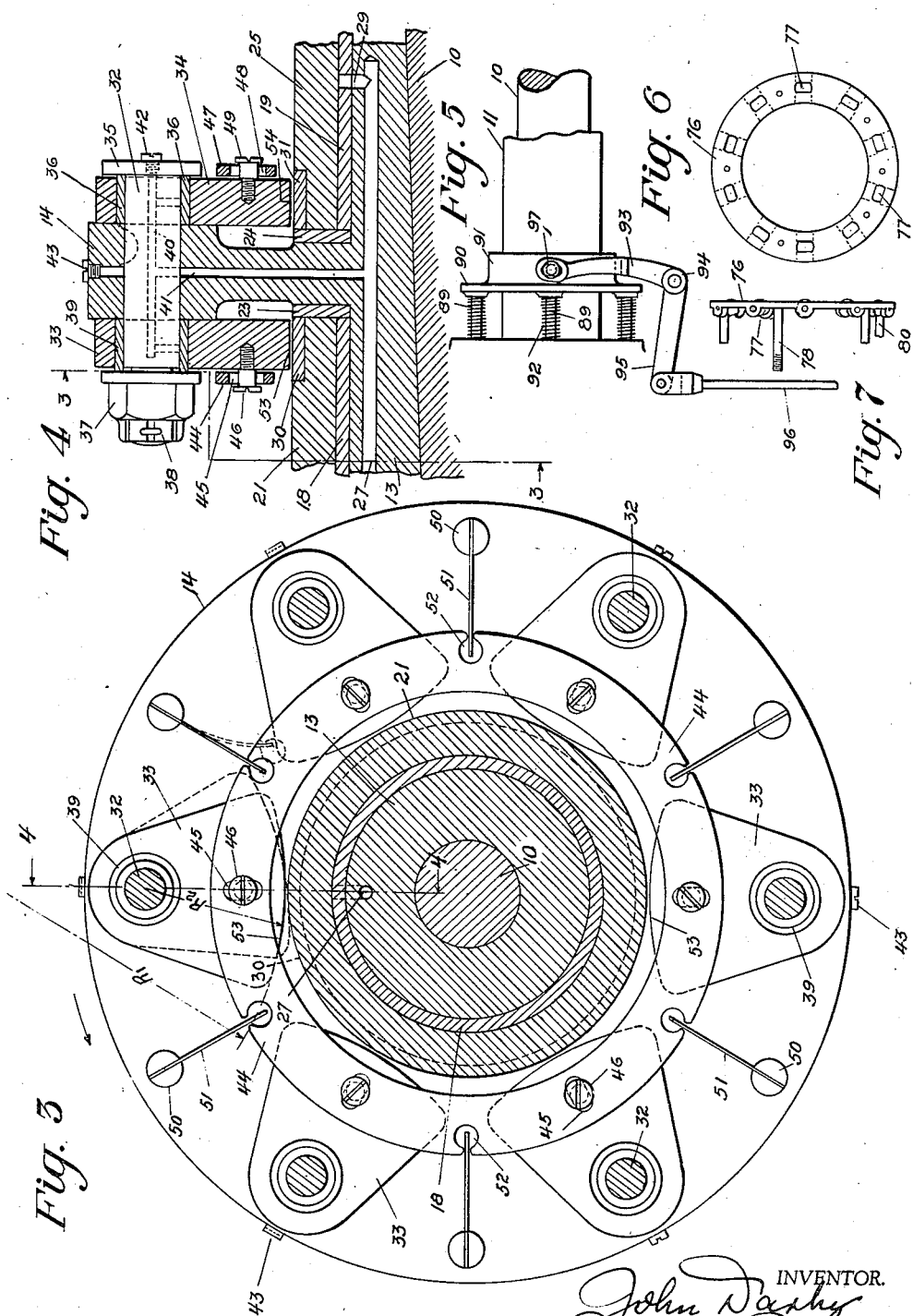
INVENTOR.
John Darby
BY Morgan Finnegan & Durham
ATTORNEYS Patented Sept. 23, 1941

2,256,826

UNITED STATES PATENT OFFICE 2,256,826

CLUTCH MECHANISM

John Darby, Summit, N. J.

Application November 10, 1939, Serial No. 303,726

8 Claims. (Cl. 192—50)

My invention relates to improvements in mechanical movements.

In order to reduce unit stress in vehicle running gear, it is customary practice to equip vehicles of certain types such as trucks, buses and the like with multiple wheel units. Dual wheel units are commonly employed although units embodying more than two wheels have been and are used.

Multiple wheel units present certain practical difficulties since the wheels in their side by side relationship must follow paths respectively having different radii of curvature when the vehicle is guided along a curved course. Unless the construction of the unit is such that its wheels may rotate relative to each other in such a case, undue tire wear will result and power requirements are excessive. Divers types of multiple wheel units have been proposed. They have in many cases proven satisfactory particularly where the wheels are relatively rotatable but are not power driven. However, it is almost uniform practice to couple the wheels of the unit for rotation together when they must function as driving wheels. The various expedients heretofore suggested as a solution to the problem of combining in a multiple wheel unit among other things the desirable features of power drive and relative rotatability of the wheels have not proven satisfactory to my knowledge.

An object of my invention therefore is to provide a novel multiple wheel unit.

Another object of my invention is to provide a novel wheel braking system for such a unit.

Another object of my invention is to provide a multiple wheel unit, any one of whose wheel elements may be power driven in a forward or reverse direction while another of the wheel elements is rotating relative thereto.

Another object of my invention is to provide a novel coupling device which is capable of transmitting torque from one element to the other element of a pair of rotatably mounted elements to effect clockwise or counterclockwise movement of said elements as a unit, but which is incapable of normally transmitting torque from the latter to the former.

Other and further objects of my invention will appear from the following description and the appended claims.

In general, I accomplish the objects of my invention by equipping a rotatably mounted driving element with a clutch mechanism rotatable therewith and movable automatically, upon angular acceleration of the driving element in either direction of rotation, into releasable torque transmitting engagement with one or more rotatably mounted driven elements. Further, in accomplishing the objects of my invention, I so construct and arrange the clutch mechanism that engagement of the driven element or elements by the clutch mechanism will continue only so long as the driving element transmits torque therethrough to the driven element or elements. Upon cessation of torque transmission, the clutch mechanism will automatically release itself from engagement with the driven element or elements permitting the latter to rotate relative to the driving element at a rate subject to control by the braking system employed.

The clutch mechanism employed comprises a locking member or members each pivotally mounted upon the driving element or a suitable extension thereof for rotation therewith and for limited yieldingly opposed angular movement relative thereto, in response to the effects of centrifugal force and inertia, upon a pivotal axis positioned outwardly of the center of mass or gravity of the locking member.

The locking member or members, if more than one be utilized, engages, upon angular displacement, a suitably contoured surface of the driven element, or elements if there be more than one, thereby establishing a locking or driving connection with the element engaged enabling the driving element to rotate the driven element about its axis. For the accomplishment of this purpose, each such locking member is formed with a suitable engaging surface contoured to provide the desired type of locking engagement with the driven element. The engaging surfaces of the respective locking members and of the driven element are preferably formed to provide a wedge-friction type of locking engagement, the intensity of which is proportional to the driving force or torque being transmitted. The engaging surfaces may be formed if desired, however, to provide positive interlocking as, for example, by forming the engaged surface of the driven element as a rack to be engaged by a locking member in the form of a symmetrical pawl. In the former case the greater the displacement of the locking member about its pivotal axis, the greater will be the intensity of the locking action between the locking member and the driven element or, in effect, between the driven element and the driving or torque-applying element. This engagement and consequent locking action will follow upon angular displacement of the locking member in either a clockwise or counterclockwise direction from a neutral position of non-engagement, to which the locking member is restored automatically by the action of suitable means such as springs or the like as soon as the transmission of torque through the locking member from the driving element to the driven element is discontinued.

In the accompanying drawings which form part of the instant specification and are to be read in conjunction therewith and in which like numbers refer to like parts throughout the several views:

Fig. 3 is a view taken along the line 3—3 of Fig. 4 showing details of the driving disc and locking members;

Fig. 4 is a fragmentary view in elevation with parts in section taken along the line 4—4 of Fig. 3 showing details of the coupling or clutching mechanism;

Fig. 5 is a plan view showing a detail of the brake actuating mechanism of Fig. 1;

Fig. 6 is a detail view in elevation of the outer wheel brake shoe actuating ring shown in Fig. 1; and, Fig. 7 is a detail view in side elevation of the brake shoe actuating ring shown in Fig. 6.

Figure 1:
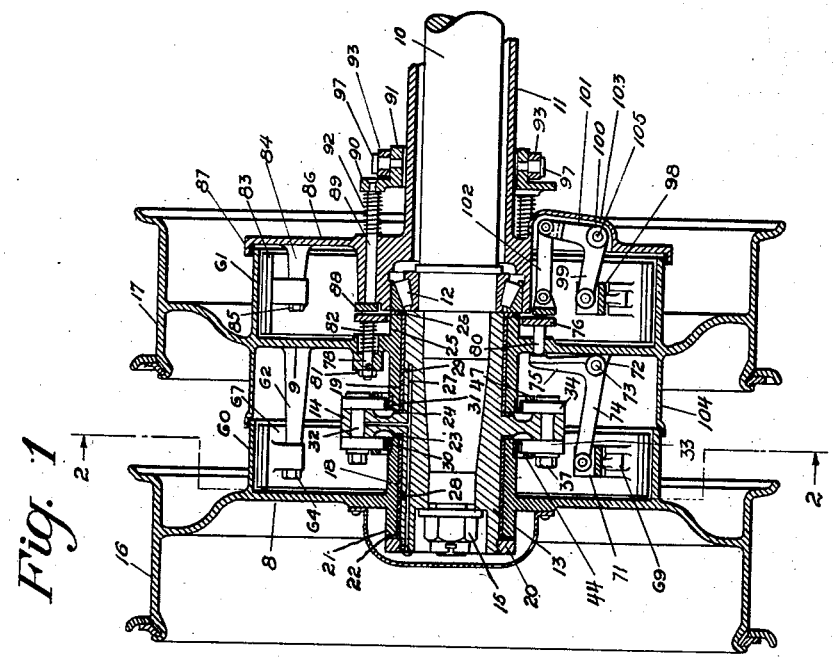
Fig. 1 is a view in elevation with parts in section taken along the line 1—1 of Fig. 2 showing a so-called dual wheel unit embodying the clutching or coupling mechanism and the braking system of my invention.
Figure 2:
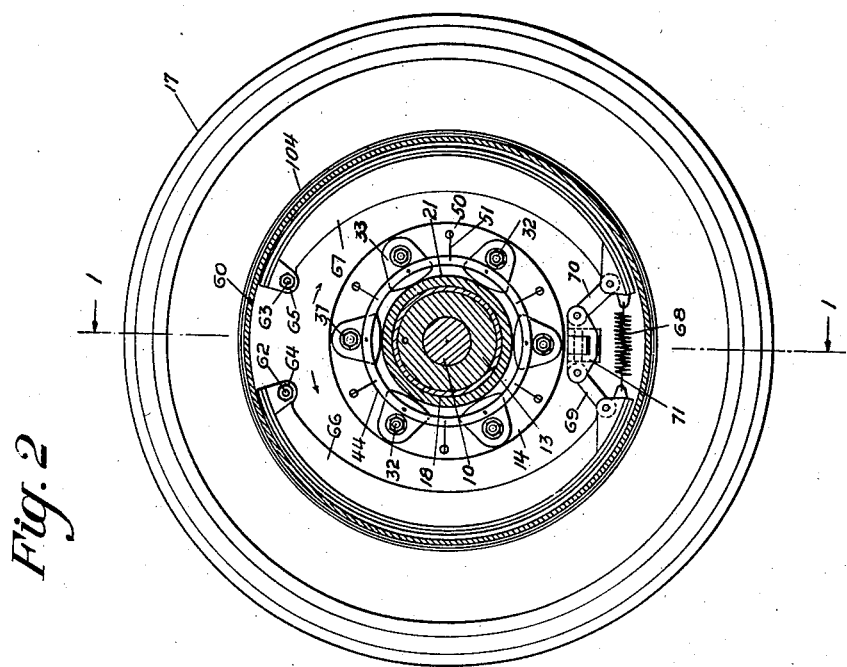
Fig. 2 is a view in elevation taken along the line 2—2 of Fig. 1 showing the manner in which the locking members are arranged upon the carrying or driving disc and showing the braking elements for the outer wheel.

Referring now more particularly to Fig. 1 of the drawings, a driving element constituted by an axle 10 is mounted for rotation in a vehicle axle housing 11 upon a roller bearing 12. A sleeve member 13 which is generally of cylindrical contour and has extended therefrom an annular driving disc 14 is splined or otherwise fixedly secured to the axle 10 for rotation therewith and is locked in position by means of a cotter-pinned castellated nut and washer assembly 15.

A pair of driven elements constituted by wheels 16 and 17 is journalled through the wheel hubs 21 and 25 respectively upon bronze sleeve bushings 18 and 19 respectively fitted upon the sleeve member 13 at either side of the driving disc 14. Thus, it will be observed that the wheel 16 is confined for rotation upon the bushing 18 between the driving disc 14 and a retaining member 20 threadedly engaging the sleeve member 13. Axial thrust of the wheel 16 is imparted to an annular bronze thrust bearing 22 interposed between the retaining member 20 and the wheel hub 21 and to an annular bronze thrust bearing 23 interposed between the driving disc 14 and the wheel hub 21. Similarly, axial thrust of the wheel 17 is imparted to an annular bronze thrust bearing 24 interposed between the driving disc 14 and the hub 25 of the wheel 17 and to an annular bronze thrust bearing 26 interposed between the hub 25 and the roller bearing 12.

A passageway 27 formed in the sleeve member 13 is provided for supplying lubricant to the various bushings through communicating passageways 28 and 29 respectively.

Hardened steel clutch rings 30 and 31 are fitted on the hubs 21 and 25 respectively at either side of the driving disc 14. These rings are preferably shrunk on the respective hubs being accommodated within suitable annular recesses thereof as is best shown in Fig. 4.

The driving disc 14 is pierced to provide a number of openings, each accommodating a shaft 32 upon which is journalled for limited angular movement a pair of hardened steel locking members 33 and 34 respectively positioned at either side of the driving disc 14.

The axis of each shaft 32 is located on a circle concentric with the axis of the driving disc 14, the respective shaft axes being spaced equal arcuate distances from each other and being parallel to the common axis of the axle 10 and driving disc 14.

Each shaft 32 is keyed to the driving disc 14 and is formed with a head 35 between which and the driving disc 14 is located a porous bronze annular bushing 36 which is concentric with the shaft 32 and forms a bearing upon which the cam 34 is adapted to oscillate. The other end of the shaft 32 is threaded and carries in threaded engagement therewith a castellated nut 37 preferably cotter pinned thereto as at 38. Secured between the nut 37 and the disc 14 is a porous bronze annular bushing 39 which is concentric with the shaft 32 and forms a bearing upon which the cam member 33 is adapted to oscillate. The shaft 32 is preferably axially drilled, as shown, to provide a passageway 40 through which lubricant may flow to the inner surface of the porous bushings 36 and 39 from the passageway 27 via the connecting passageway 41 in the driving disc 14. The passageways 40 and 41 are capped by the threaded elements 42 and 43 respectively.

A coupling ring 44 concentric with the axis of the axle 10 and having radially arranged slots 45 is loosely secured to the locking members 33 by means of the headed journal bolts 46. Similarly, a coupling ring 47 concentric with the axis of the axle 10 and having radially arranged slots 48 is loosely secured to the locking members 34 by means of the headed journal bolts 49. The slots 45 and 48 are each preferably formed with parallel side walls throughout the major portion of their length. These side walls are spaced from each other a distance equal to, or at the most, slightly greater than the diameter of the portion of the journal bolts 46 and 49. Consequently, angular movement of any one of the locking members 33 will be imparted equally by the coupling ring 44 to all of the locking members 33 and angular movement of any one of the locking members 34 will be equally imparted by the coupling ring 47 to all of the locking members 34.

A number of pins 50 whose ends are slotted are fitted within suitable openings in the driving disc 14 which are arranged in a circle concentric with the axis of the driving disc. The pins 50 extend equal distances outwardly from the opposite faces of the driving disc and are spaced equal arcuate distances from each other. In Fig. 3, I have shown flexible resilient members 51 each secured at one end to a slotted pin 50 and extending radially inwardly therefrom toward the center of the coupling ring 44. The other end of each resilient member 51 is slidably fitted within one of a corresponding number of recesses 52 formed within the coupling ring 44. The recesses 52 are preferably characterized by a contour such that angular movement of the coupling ring in either direction will not interfere with retraction and projection of each resilient member from and into its recess consequent upon such angular movement. Although I have shown in Fig. 3 the relationship as it exists between the resilient members 51 and the coupling ring 44, it is to be understood, however, that the construction and arrangement thereof is duplicated with respect to the coupling ring 47.

The locking members 33 and 34 have cam faces or surfaces 53 and 54 which in the neutral position of the locking members are slightly spaced from the adjacent surface of the clutch rings 30 and 31 respectively. In addition, each cam face has a radius of curvature $R_1$ greater than the radius of curvature $R_2$ of the circle of oscillation of each locking member. Accordingly, and referring to Fig. 3, if a locking member 33, for example, is angularly displaced clockwise or counterclockwise from a neutral position about the axis of the shaft 32, its cam surface 53 will come into contact with the clutch ring 30 by reason of the difference in the radii of curvature of the cam surface 53 and the circle of oscillation of the locking member. A wedging or locking action between the locking member and the clutch ring will result rendering transmission of torque from the driving axle to the wheel hub possible.

The construction above described is such that the axle 10 will during rectilinear movement drive both of the wheels 16 and 17 as a unit in either a forward or a reverse direction. On the other hand, if the conditions be such as to require that either wheel should rotate more rapidly than the other or should rotate more slowly than the other during clockwise or counterclockwise movement, it may do so.

When the wheels are at rest and no power is applied to the driving axle 10, all the locking members take the neutral position shown in solid outline in Fig. 3. In this position, the cam surfaces 53, for example, will be wholly out of contact with the steel ring 30. They are normally maintained in this neutral disengaged position by the action of the resilient members or fingers 51 acting through the coupling ring 44 on the respective locking members 33.

As the axle 10 is set in motion and caused to rotate on its axis, it carries with it the sleeve member 13 of which the driving disc 14 forms a part. However, the locking members 33, for example, by reason of the eccentricity of their centers of mass and suspension will be subjected to inertia forces in proportion to the angular acceleration of the driving disc, resulting in an angular displacement of each locking member 33 about the axis of its supporting shaft 32. This resultant condition is best illustrated in Fig. 3 wherein rotation of the driving disc 14 in a counter-clockwise direction would result in a displacement of each of the locking members 33 (and of the cam members 34) to the dotted line engaged position shown for a single cam. The locking members 33 and the locking members 34 being coupled together by means of the rings 44 and 47 respectively will be moved equal angular distances about their respective axes of suspension. The movement which is thus imparted to the ring 44 is communicated thereby to the resilient members 51 displacing them from their neutral position to a dotted line position such as is shown for a single member in Fig. 3. Since the cam surface 53 of a locking member 33, for example, has a radius of curvature greater than that of the circle of oscillation of its locking member, the angular displacement of the locking member 33 will cause the cam surface 53 and the adjacent clutch ring 30 to come into contact with each other with a resultant locking or wedging action, the magnitude of which will be commensurate with the torque or driving force applied by the axle 10. Thus, the driving disc 14 through the displacement of the locking members 33 and 34 will be locked to the hubs 21 and 25 of the wheels 16 and 17 respectively thereby to cause the wheels and axle to rotate as a unit. The formation of each surface about an axis of symmetry and the mode of suspension of the cam member permits the attainment of this result in either direction of rotation of the axle 10 so that positive driving of the wheels may be achieved in either a clockwise or a counter-clockwise direction of rotation.

In the event that the wheels are directed from a rectilinear into a curvilinear path as would occur, for example, with a vehicle following the curve of a road, the construction is such that the transmission of torque from the axle to that wheel which must rotate more rapidly in following the curved path ceases automatically. Thus, if the wheel assembly shown in Fig. 1 were caused to follow a curved path to the right, the wheel 16 will be caused to rotate more rapidly than the wheel 17 and the driving disc 14, and the wedging pressure between the cam members 33 and the ring 30 is relieved, allowing the ring 30 and wheel 16 to slide relatively to the driving cam members 33, which nevertheless are maintained in contact with the ring 30 by the combined action of centrifugal force and inertia, ready to cause driving reengagement when the angular velocity of driving element 13 tends to exceed that of the wheel 16.

It is apparent that the action of the cams 33 and 34 is the same in either direction. As a result, the wheels 16 and 17 may be driven together as a unit; one may rotate relative to the other as they follow a curvilinear path; they may rotate relative to the axle 10 and to each other when no power is applied thereto from the axle; and they may rotate relative to the axle or relative to each other where the power applied to the axle is insufficient to effect angular rotation of the axle at a rate equal to the rate of angular rotation of the wheels.

It is to be understood, of course, that although I have shown the driving disc 14 equipped with two sets of locking members, each set having six locking members, fewer locking members and correspondingly fewer restoring spring elements 51 may be feasible and perhaps desirable in each set. Under certain circumstances a greater number of locking members may be both feasible and desirable. Such variations, of course, will readily suggest themselves to those skilled in the art.

Brake drums 60 and 61 extending from the flanges 8 and 9 respectively of the wheels 16 and 17 respectively are adapted to be engaged at will by suitable braking elements actuatable through a novel braking system, all as hereinafter more particularly described.

Brake shoe mounting posts 62 and 63 affixed to the wheel flange 9 and rotatable therewith have hingedly secured thereto by means of nuts 64 and 65 respectively, lined brake shoes 66 and 67 respectively whose other ends are hingedly connected by means of a retractor spring 68.

Links 69 and 70 hingedly connect the brake shoes 66 and 67 respectively and a brake shoe spreader member 71.

A bell crank member 72 journaled on a shaft 73 affixed to the wheel flange 9 has one arm 74 hingedly connected to the spreader member 71 and has its other arm 75 extending radially inwardly substantially parallel to the plane of the wheel flange 9.

A bell crank actuating ring 76 having anti-friction rollers 77 journaled therein is carried by the wheel flange 9 for movement reciprocally of the axle 10 and in concentric relation thereto upon pins 78 slidably received in correspondingly located openings in the wheel flange 9.

A bell crank actuating pin 80 extends laterally from the ring 76 through the wheel flange 9 into engagement with the arm 75 of the bell crank member 72.

One end of each pin 78 is threaded, the thread ends being engaged by nuts 81 adjustable to limit the inward movement of the ring 76. Helical springs 82 encompassing the pins 78 between the ring 76 and the wheel flange 9 normally maintain the ring 76 and the wheel flange 9 in predetermined spaced relation to each other.

The brake drum 61 of the wheel 17 is adapted to be engaged at will by a pair of lined brake shoes mounted in variable relation thereto in a manner similar to the mounting of brake shoes 66 and 67 of the wheel 16. In Fig. 1, for example, I have shown the brake shoe 83, constituting one of the pair of brake shoes for the wheel 17, hingedly mounted on the brake shoe mounting post 84 to which it is secured by means of the nut 85. The brake shoe mounting post 84 is affixed to a mounting plate 86 extending annularly outwardly from the axle housing 11. The mounting plate 86 is formed with an axially extending concentric flange 87 telescopically sealingly engaging the brake drum 61 thereby to prevent the entrance of dirt, water or other foreign matter into the brake shoe chamber.

A ring 88 concentric with the axle 10 is carried by the mounting plate 86 for reciprocal movement axially of the wheel 17 by means of pins 89 extending through correspondingly located openings in the mounting plate. In the construction shown in Figs. 1 and 5, the pins 89 are five in number, although more or less may be found necessary or feasible. The pins 89 are preferably located on a circle whose axis is concentric with the axis of the ring 88. One end of each pin threadedly engages an annular flange 90 of a brake shoe operating ring surrounding the axle housing 11. Helical springs 92 encompassing the pins 89 between the flanges 86 and 90 normally hold the ring 88 in the retracted position shown in Fig. 1.

The yoke arm 93 of bell crank lever 94 whose other arm 95 is pinned to a brake lever connecting rod 96 is secured by means of pins 97 to the brake operating ring 91 whereby restricted axial movement of the brake operating ring 91 can be obtained by movement of the connecting rod 96.

A brake shoe spreader member 98 is pinned to the arm 99 of a bell crank lever 100 whose other arm 101 is hingedly connected by means of a link 102 with the ring 88.

The bell crank lever 100 is hingedly mounted upon a shaft 105 located in a recess 103 in the mounting plate 86 so that the plane of the arms 99 and 101 extends radially from the axis of the axle 10.

A dust ring 104 concentric with the axle 10 extends axially from the wheel flange 9 into telescopic sliding engagement with the brake drum 60 to seal the brake shoe chamber against the entry of water, dirt or other foreign matter.

Thus, it will be observed that the combination and relationship of the parts constituting the brake mechanism is such that movement of the brake lever connecting rod 96 will force the respective brake shoes into engagement with the brake drums 60 and 61. As tension is applied to the connecting rod 96 to effect movement of bell crank lever 94, the brake operating ring 91 will be moved axially outwardly to effect a corresponding axial outer movement of the pins 89 against the resistance offered by the springs 92. The pins 89 carry with them in their outer movement the ring 88 which, in turn, through the medium of the link 102 and the bell crank lever 100 effects a displacement of the spreader bar 98 causing the brake shoe 83 (and its mate not shown) to be pressed against the brake drum 61 thereby to retard or stop rotation of the wheel 17.

After the ring 88 is moved axially outwardly to a predetermined distance, it comes into contact with the anti-friction rollers 77 of the brake actuating ring 76. Further movement of the ring 88 causes axial outward movement of the ring 76 against the resistance offered by the springs 82. This movement of the ring 76 is communicated through the pin 80 to the arm 75 of the bell crank lever 72 which latter is moved angularly about its axis 73. This angular movement is transmitted by the arm 74 to the spreader member 71 which, in turn, through the links 69 and 70 effects angular displacement of the brake shoes 66 and 67 about the brake shoe support members 62 and 63 into engagement with the brake drum 60 thereby to retard or stop rotation of the wheel 60 about its axis.

As the braking force is removed from the brake lever connecting rod 96, the rings 76 and 88 will be moved axially inwardly and ultimately returned to their normal inoperative positions shown in Fig. 1 by means of the springs 82 and 92 respectively. The spacing between the rings 76 and 88 is normally such that braking effort will be transmitted to the wheel 17 before being transmitted to the wheel 16. The amount of this lag in application of the braking effort is controllable by adjustment of the nuts 81 on the lugs 78 of the ring 76 so as to provide more or less space between the rings 76 and 88 in their normal inoperative positions. The greater the distance between the two rings, the more will be the lag in the application of the braking effort to the wheel 16. Conversely, the closer the two rings are to each other in their normal inoperative position, the less will be the lag in the application of the braking force of the wheel 16. Obviously, if the rings are touching in their normal operating position, the braking effort will be applied simultaneously and equally to both of the wheels.

It will be observed that I have accomplished the objects of my invention. I have provided a novel dual wheel unit in which torque may be applied optionally to both of the wheel elements in either direction of rotation thereof, or to one of the wheel elements in either direction of rotation thereof while the other is rotating relative thereto, and in which both wheel elements may optionally be allowed to rotate relative to each other and to the driving axle; I have provided a novel braking construction for such a dual wheel unit by means of which a braking effort can be applied to the wheel elements whether they are rotating freely or are being driven as a unit or are rotating relative to each other; I have provided a novel braking construction for such a wheel unit by means of which the wheel elements may be progressively braked without regard to whether the wheel elements are being driven separately or are rotating relative to the torque applying means; and, I have provided a novel mechanical movement for multiple wheel units, differential mechanisms, systems for transmitting mechanical power and the like, capable of transmitting torque from one to the other of a pair of rotatably mounted elements in either direction of rotation thereof but incapable of transmitting torque from the latter to the former.

It will be observed that certain features and sub-combinations of my invention are of utility and may be employed without reference to other features and sub-combinations thereof. This is contemplated by and is within the scope of the appended claims. It is further obvious that various changes may be made in details within the scope of the appended claims without departing from the spirit of this invention. It is, therefore, to be understood that this invention is not to be limited to the specific details described.

Having thus described the invention, what is claimed is:

1. The combination with rotatably mounted elements of a coupling device therefor comprising a locking member so mounted pivotally upon one of said elements that by angular acceleration of said element relative to another of said elements, said member may be caused to pivot upon its axis into a position of driving engagement with said latter element, and by angular acceleration of said latter element relative to said former element, said member may be caused to pivot upon its axis out of said position of driving engagement; and, means opposing pivotal movement of said driving member into said driving position.

2. The combination with rotatably mounted elements of a coupling device therefor comprising locking members so mounted pivotally upon one of said elements that by angular acceleration of said element relative to another of said elements, said members may be caused to pivot upon their respective axes into a position of driving engagement with said latter element, and by angular acceleration of said latter element relative to said former element, said members may be caused to pivot upon their respective axes out of said position of driving engagement; and, means connecting said members for causing said members to pivot together.

3. The combination with rotatably mounted elements of a coupling device therefor comprising locking members so mounted pivotally upon one of said elements that by angular acceleration of said element relative to another of said elements, said members may be caused to pivot upon their respective axes into a position of driving engagement with said latter element, and by angular acceleration of said latter element relative to said former element, said members may be caused to pivot upon their respective axes out of said position of driving engagement, means connecting said members for causing said members to pivot together; and, means acting upon said connecting means for opposing pivotal movement of said members into said driving position.

4. The combination with rotatably mounted elements of a coupling device therefor comprising a locking member so mounted pivotally upon one of said elements that by angular acceleration of said element relative to another of said elements while said elements are rotating in either a clockwise or counter-clockwise direction, said member may be caused to pivot upon its axis into a position of driving engagement with said latter element, and by angular acceleration of said latter element relative to said former element while said elements are rotating in either a clockwise or counter-clockwise direction, said member may be caused to pivot upon its axis out of said position of driving engagement.

5. Vehicle running gear comprising a driving axle; means forming a driving member extending radially outwardly from said axle and rotatable therewith; a vehicle wheel at either side of said driving member, said wheels and axle having a common axis and being relatively rotatable; a locking member at either side of said driving member, said locking members respectively being adapted to engage the hub of the corresponding wheel, said locking members respectively being mounted on said driving member for movement pivotally thereof upon an axis parallel to and spaced from said common axis, said locking members respectively having an engaging surface of symmetrical contour whose radius of curvature is greater than the distance from the pivotal axis of the locking member to the hub of the wheel adapted to be engaged by said locking member; and, means opposing pivotal movement of said locking members into said locking position.

6. Vehicle running gear comprising a driving axle; a sleeve member coaxially aligned and rotatable with said axle; a driving disc integral with said sleeve member, said driving disc being located intermediate the ends of and coaxial with said sleeve member; a wheel journaled upon said sleeve member at either side of said driving disc; a locking member mounted on said driving disc at either side thereof for movement pivotally thereof upon an axis constituting an element of a cylindrical surface of revolution coaxial with said axle, each said locking member having a cam surface of circular contour adapted upon angular displacement of the locking member upon its pivotal axis in either a clockwise or counter-clockwise direction from a neutral position to engage the hub of one of said wheels thereby to lock the said wheel and said driving disc to each other for rotation as a unit, each said cam surface having a radius of curvature greater than the radius of curvature of the circle of oscillation of the said locking member; and, means for yieldingly opposing angular displacement of each said locking member upon its axis.

7. Vehicle running gear comprising a driving axle; a sleeve member coaxially aligned with and rotatable with said driving axle; a driving disc integral with said sleeve member, said driving disc being located intermediate the ends of and coaxial with said sleeve member; a wheel journaled upon said sleeve member at either side of said driving disc; locking members mounted on said driving disc at either side thereof for movement pivotally thereof upon axes constituting elements of a cylindrical surface of revolution coaxial with said axle; each said locking member having a symmetric cam surface adapted upon angular displacement of the said locking member upon its pivotal axis in either a clockwise or counter-clockwise direction from a neutral position to engage the hub of the wheel at the corresponding side of said disc thereby to lock the said wheel and said disc to each other for rotation as a unit; a coupling ring at either side of said disc each connecting the locking members at the corresponding side of said disc for displacement as a unit; and, means associated with said coupling rings and said disc for yieldingly opposing displacement of said rings and locking members.

8. The combination with rotatably mounted elements of a coupling device therefor comprising a cylindrical member, a rotatable coaxial member having locking members pivotally mounted on said coaxial member, said locking members having eccentric faces to engage said cylindrical member, said eccentric faces being positioned between their pivot and the cylindrical member so that by angular acceleration of one of said elements relative to another of said elements, said member may be caused to pivot upon its axis into a position of driving engagement with said latter element, and by angular acceleration of said latter element relative to said former element, said member may be caused to pivot upon its axis out of said position of driving engagement.

JOHN DARBY.